(12) United States Patent
Géhberger et al.

(10) Patent No.: US 12,314,775 B2
(45) Date of Patent: May 27, 2025

(54) METHODS AND APPARATUS FOR SELECTION OF A VIRTUALISATION ENGINE

(71) Applicant: Telefonaktiebolaget LM Ericsson (publ), Stockholm (SE)

(72) Inventors: Dániel Géhberger, Montreal (CA); András Császár, Telki (HU); Dávid Kovács, Cegléd (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 555 days.

(21) Appl. No.: 17/612,253

(22) PCT Filed: May 24, 2019

(86) PCT No.: PCT/EP2019/063529
§ 371 (c)(1),
(2) Date: Nov. 18, 2021

(87) PCT Pub. No.: WO2020/239194
PCT Pub. Date: Dec. 3, 2020

(65) Prior Publication Data
US 2022/0164241 A1    May 26, 2022

(51) Int. Cl.
*G06F 9/50* (2006.01)
*G06F 21/54* (2013.01)
*G06F 21/55* (2013.01)

(52) U.S. Cl.
CPC .......... *G06F 9/5077* (2013.01); *G06F 9/5038* (2013.01); *G06F 9/5055* (2013.01); *G06F 21/54* (2013.01); *G06F 21/554* (2013.01)

(58) Field of Classification Search
CPC .... G06F 9/5077; G06F 9/5038; G06F 9/5055; G06F 21/54; G06F 21/554
See application file for complete search history.

(56) References Cited

U.S. PATENT DOCUMENTS 10,009,251 B1 * 6/2018 Koster ................. H04L 67/141
10,099,864 B1 * 10/2018 Gopalakrishnan ........ B07C 5/00
(Continued)

OTHER PUBLICATIONS

Assmann, Baptiste, "Hypervisors Virtual Network Performance Comparison from a Virtualized Load Balancer Point of View", HAProxy Technologies, https://www.haproxy.com/blog/hypervisors-virtual-network-performance-comparison-from-a-virtualized-load-balancer-point-of-view/, Apr. 24, 2012, 1-18.
(Continued)

*Primary Examiner* — April Y Blair
*Assistant Examiner* — Jonathan R Labud
(74) *Attorney, Agent, or Firm* — Murphy, Bilak & Homiller, PLLC

(57) ABSTRACT

Embodiments described herein relate to methods and apparatuses for selecting a first virtualisation engine to execute an application deployment request. A method in a selection engine (104, 700) comprises receiving (300) an application deployment request (101) comprising an identification of an application image (102); selecting (306) the first virtualisation engine from a plurality of virtualisation engines based on a plurality of respective values of at least one characteristic associated with execution of the application image by each of the plurality of virtualisation engines; and initiating (308) execution of the application image by the first virtualisation engine.

13 Claims, 6 Drawing Sheets

(56) References Cited

U.S. PATENT DOCUMENTS

| | | |
|---|---|---|
| 10,104,185 B1 | 10/2018 | Sharifi Mehr et al. |
| 2012/0089968 A1 | 4/2012 | Varadarajan et al. |
| 2012/0102486 A1* | 4/2012 | Yendluri ............... G06F 9/5072 |
| | | 717/176 |
| 2013/0227132 A1 | 8/2013 | Heninger et al. |
| 2017/0052807 A1* | 2/2017 | Kristiansson ............. G06F 8/60 |
| 2018/0089068 A1* | 3/2018 | Bhojan ................... H04W 4/50 |
| 2019/0065274 A1 | 2/2019 | Chauhan et al. |

OTHER PUBLICATIONS

Author Unknown, "Comparison of platform virtualization software", Wikipedia, https://en.wikipedia.org/wiki/Comparison_of_platform_virtualization_software#Image_type_compatibility, accessed Oct. 13, 2021, 1-15.

Author Unknown, "Dirty COW (CVE-2016-5195)", Privilege escalation vulnerability in the Linux Kernel, https://dirtycow.ninja/, accessed Oct. 13, 2021, 1-5.

Budhprakash, "A comparative study of Various Hypervisors Performance", International Journal of Scientific & Engineering Research, vol. 7, Issue 12, Dec. 2016, 65-71.

Graniszewski, Waldemar, et al., "Performance analysis of selected hypervisors (Virtual Machine Monitors—VMMs)", International Journal of Electronics and Telecommunications, vol. 62, No. 3, Sep. 2016, 231-236.

Hwang, Jinho, et al., "A Component Based Performance Comparison of Four Hypervisors", Conference Paper, https://www.researchgate.net/publication/242105480, May 2013, 1-9.

Jiang, Congfeng, et al., "Energy efficiency comparison of hypervisors", Sustainable Computing: Informatics and Systems, vol. 22, Elsevier, 2019, 311-321.

* cited by examiner

METHODS AND APPARATUS FOR SELECTION OF A VIRTUALISATION ENGINE

TECHNICAL FIELD

Embodiments described herein relate to methods and apparatus for selecting a first virtualisation engine to execute an application deployment request.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Different types of virtualization have gained traction with the widespread adaptation of cloud computing. Today, there are multiple technologies available for virtualization, but two significantly different approaches are virtual machines and containers.

With a traditional virtual machine, a whole computer environment is virtualized, including the operating system kernel and applications. Virtual machines are executed and managed by hypervisors. Multiple mature hypervisors exist today including Quick Emulator (QEMU)-Kernel-based Virtual Machine (KVM), VMWare, Hyper-V and Xen. For virtual machines, the operating system kernel can be different compared to the kernel of the physical machine (referred also as host machine). Modern Central Processing Units (CPUs) have specialized instruction sets and execution rings to optimize the performance of virtual machines. In general, virtual machines achieve a high level of separation from the host machine and other virtual machines executed on the same host machine. The virtual machine world is not standardized in general, the different hypervisors support multiple image formats, and in general it is possible to convert one image format to another image format, making it possible to run the same image under different hypervisors. There are also solutions for building multi-hypervisor environments (e.g. an OpenStack cloud with multiple hypervisors).

With a traditional container, the virtualization is achieved in the kernel by using namespaces for logical separation (e.g. Process identifications (PIDs) of other processes, networking of other processes) and cgroups for physical resource (e.g. CPU share) separation. Containers in general are believed to be less secure than virtual machines because e.g. kernel bugs can lead to privilege escalations.

The container world has recently started to move towards standardization led by the Open Container Initiative (OCI). As of today two specifications exist: the runtime specification and the bundle specification. These OCI specifications make it possible for multiple runtimes to be developed that can execute the same container images.

Since the publication of the standard, multiple compatible runtimes have been open sourced (e.g. runC, KataContainers, crun, gVisor). In practice, the OCI specifications enable simply changing the container runtime engine under Docker. Due to the OCI specifications it also became possible to blend the virtual machine and container worlds. An example is Kata Containers which, despite its name, launches lightweight virtual machines when used as a container runtime under Docker.

For both virtual machines and containers, the different virtualization engines (hypervisors/container runtimes) may provide different performance and sometimes feature characteristics. For example, if we compare container runtimes some of them may provide faster container startup (e.g. gVisor), while others may bring significant security improvements (e.g. KataContainers). Regarding virtual machines, it has been reported recently that the different hypervisors have different energy efficiencies whilst running the same virtual machines.

While existing solutions support multiple virtualization engines (either virtual machine or container), the selection between such virtualisation engines is only available manually. For example, for Docker the—runtime flag can be used when calling the docker run command. Pouch containers from Alibaba Cloud also openly supports multiple container runtimes with manual selection. For OpenStack the hypervisor_type tag can be used to determine which hypervisor to use in a multi-hypervisor environment.

Such manual selection can result in: suboptimal performance for applications, for example for some applications the startup time may be the most important performance characteristic; suboptimal resource utilization for the provider, for example using a runtime with lower memory footprint may be more beneficial; insufficient security level, for example, sacrificing performance to reach high security level for some applications in a container environment may be desirable.

SUMMARY

According to some embodiments there is provided a method performed by a selection engine for selecting a first virtualisation engine to execute an application deployment request. The method comprises receiving the application deployment request comprising an identification of an application image; selecting the first virtualisation engine from a plurality of virtualisation engines based on a plurality of respective values of at least one characteristic associated with execution of the application image by each of the plurality of virtualisation engines; and initiating execution of the application image by the first virtualisation engine.

According to some embodiments there is provided a selection engine for selecting a first virtualisation engine to execute an application deployment request. The selection engine comprises processing circuitry configured to receive the application deployment request comprising an identification of an application image; select the first virtualisation engine from a plurality of virtualisation engines based on a plurality of respective values of at least one characteristic associated with execution of the application image by each of the plurality of virtualisation engines; and initiate execution of the application image by the first virtualisation engine.

According to some embodiments there is provided a computer program comprising instructions which, when executed on at least one processor, cause the at least one processor to carry out a method as described herein.

According to some embodiments there is provided a carrier containing a computer program as described above, wherein the carrier comprises one of an electronic signal, optical signal, radio signal or computer readable storage medium.

According to some embodiments there is provided a computer program product comprising non transitory computer readable media having stored thereon a computer program as described above.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein provide dynamic and automatic selection of a virtualization engine technology for cloud providers. A combination of heuristics and configurations may be used to select the appropriate virtualization engine to execute a particular application image. A user may also influence the selection decision with hints or recommendations provided together with the application image deployment request. This dynamic selection makes it possible to meet requirements, for example relating to performance, security and cost for each application image individually in the same cloud environment. Subsequent deployments of the same application image may also be executed using different virtualization engines in order to find the best option. Automatic defense solutions may also be enabled against malicious user applications.

Figure 1:
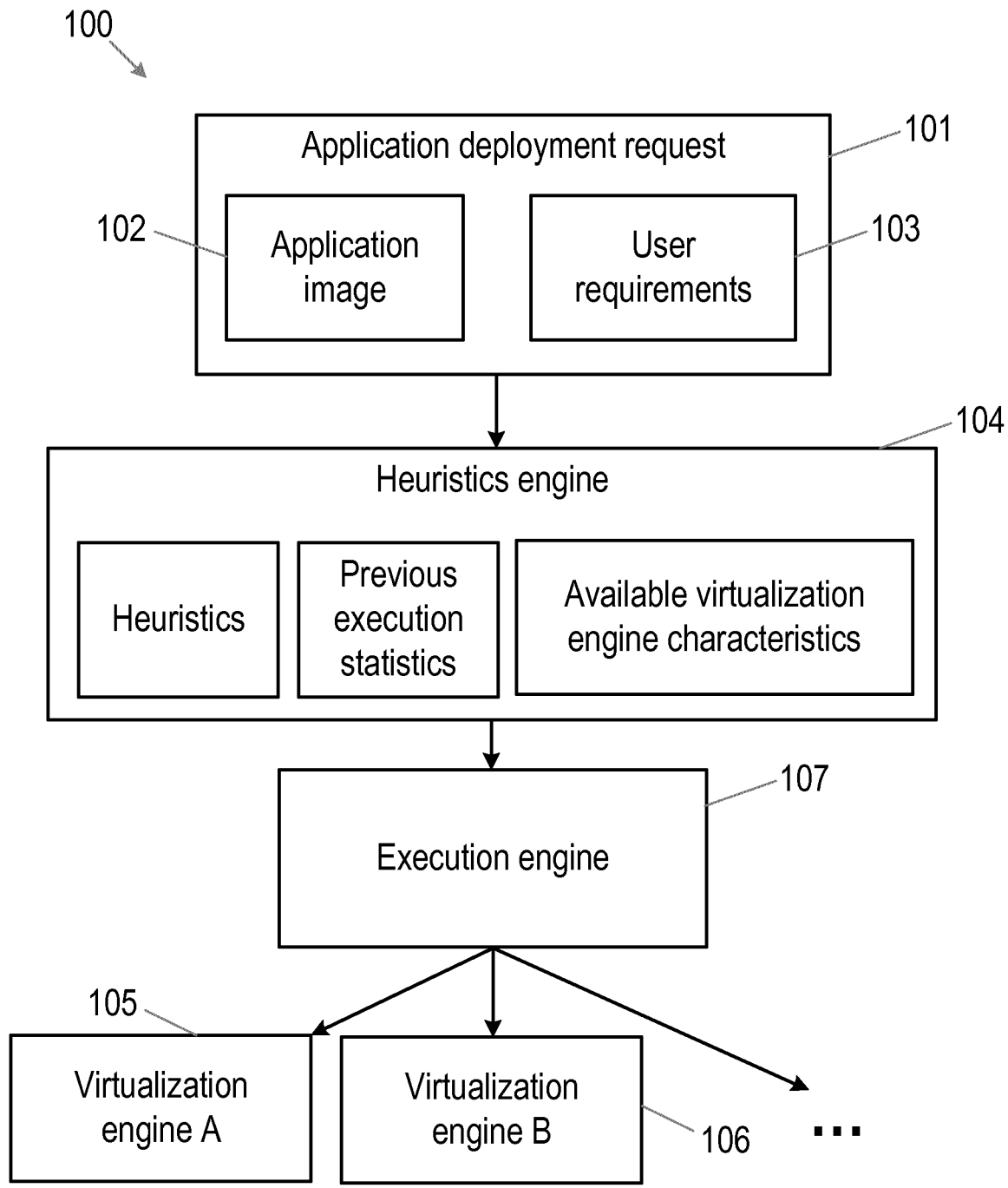
FIG. 1 illustrates a block diagram of a system according to some embodiments.

FIG. 1 illustrates a block diagram of a logical architecture of a system according to some embodiments.

The system 100 comprises an application deployment request block 101. The application deployment request comprises an identification of an application image being request for deployment, or the application image 102 itself. The application deployment request 101 may also comprise an indication of a user requirement 103 associated with the virtualisation engine to be selected to execute the application image. An application image may comprise the information necessary to execute the application in a container. An application image may also be defined as a binary comprising requirements for running a single container. An application image may also comprise metadata describing the applications needs and capabilities. A virtual machine (VM) may comprise a software implementation of a machine (i.e. a computer) that executes programs like a physical machine. An application image of a virtual machine may comprise a copy of the application, which may contain an operating system (OS), data files, and applications (similarly to a personal computer).

The system 100 further comprises a selection engine 104. The selection engine 104 may be configured to determine, based on at least the identification of the application image, a virtualisation engine to execute the application image.

The selection engine 104 receives the application deployment request 101. Upon receiving the application deployment request 101, the selection engine 104, evaluates one or more heuristics to decide which virtualization engine (i.e. engine A, engine B etc.) 105, 106, should be used for the given application deployment request 101. (For clarity only two virtualisation engines are illustrated, although it will be appreciated that there may be any number of possible virtualisation engines). For these heuristics, the selection engine 104 may use available virtualization engine characteristics, any user requirements in the application deployment request 101, previous execution statistics, and/or provide requirements. After selecting the appropriate virtualization engine, an execution engine 107 may be instructed to deploy the application image using the selected virtualization engine.

The execution engine 105 may receive the application image from the selection engine 104, or from a separate engine.

Figure 2:
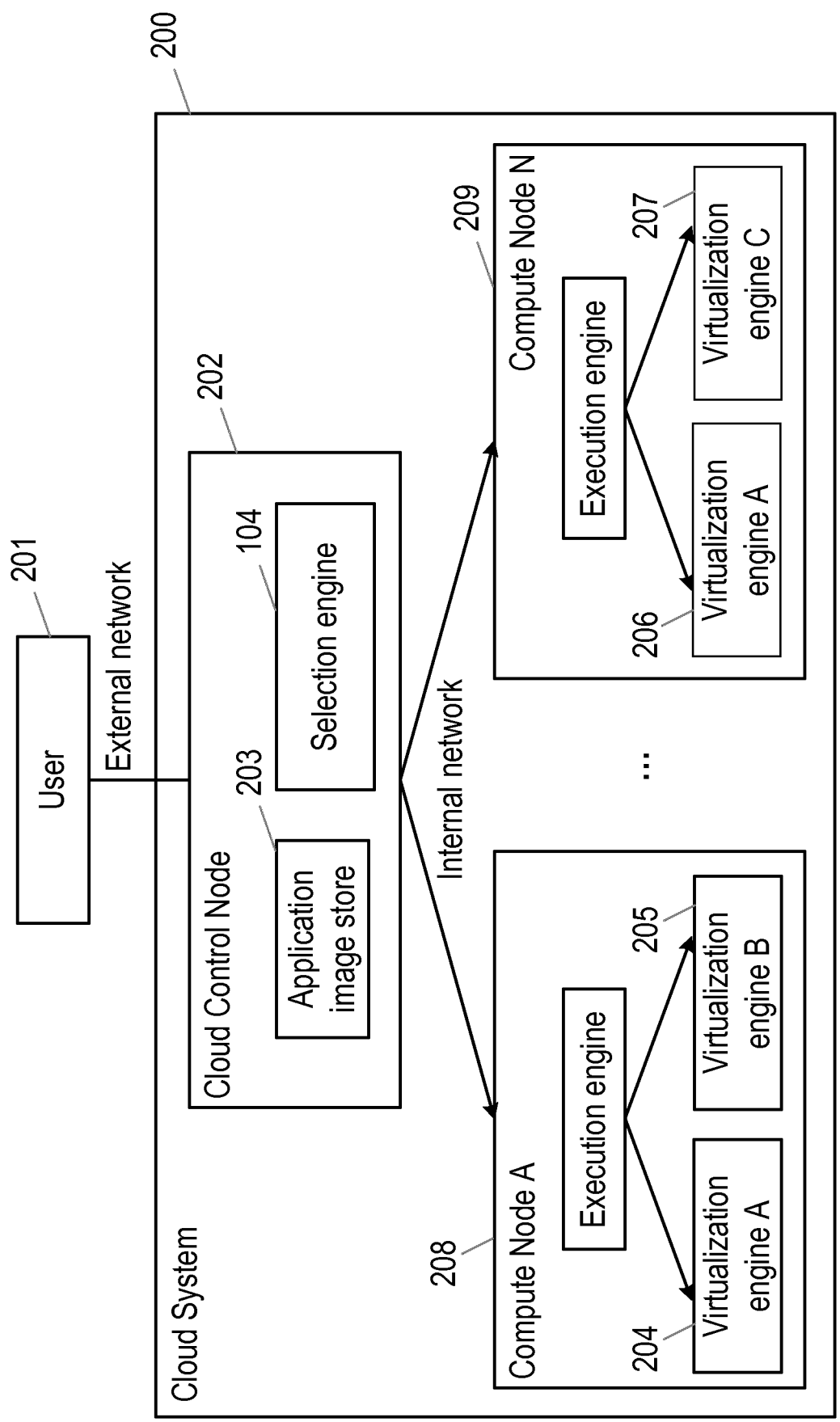
FIG. 2 illustrates a system level architecture according to some embodiments.

FIG. 2 illustrates a system level architecture according to some embodiments. The User 201 represents the entity who submits the application deployment request 101 as illustrated in FIG. 1, to the system, which in this example comprises a cloud implemented system 200.

The cloud system 200 comprises a control node 202 that comprises selection engine 104 as described with reference to FIG. 1. The control node 202 may also comprise an application image store 203.

For example, the application identification forming part of the application deployment request may comprise a reference to an application image in the application image store 203.

After the selection engine 104 selects the virtualization engine, 204, 205, 206 or 207, to use to execute the application image, the application image is deployed on one of the compute nodes 208 or 209 of the cloud system 200. As the figure implies, it is possible that not all compute nodes support all Virtualization engines. In this example, virtualisation engine A is supported by both compute node 208 and 209, however, virtualisation engine B is only supported by compute node 208, and virtualisation engine C is only supported by compute node 209. The control node 202 may therefore keep track of the availability of the different virtualization engines on the different compute nodes.

Figure 3:
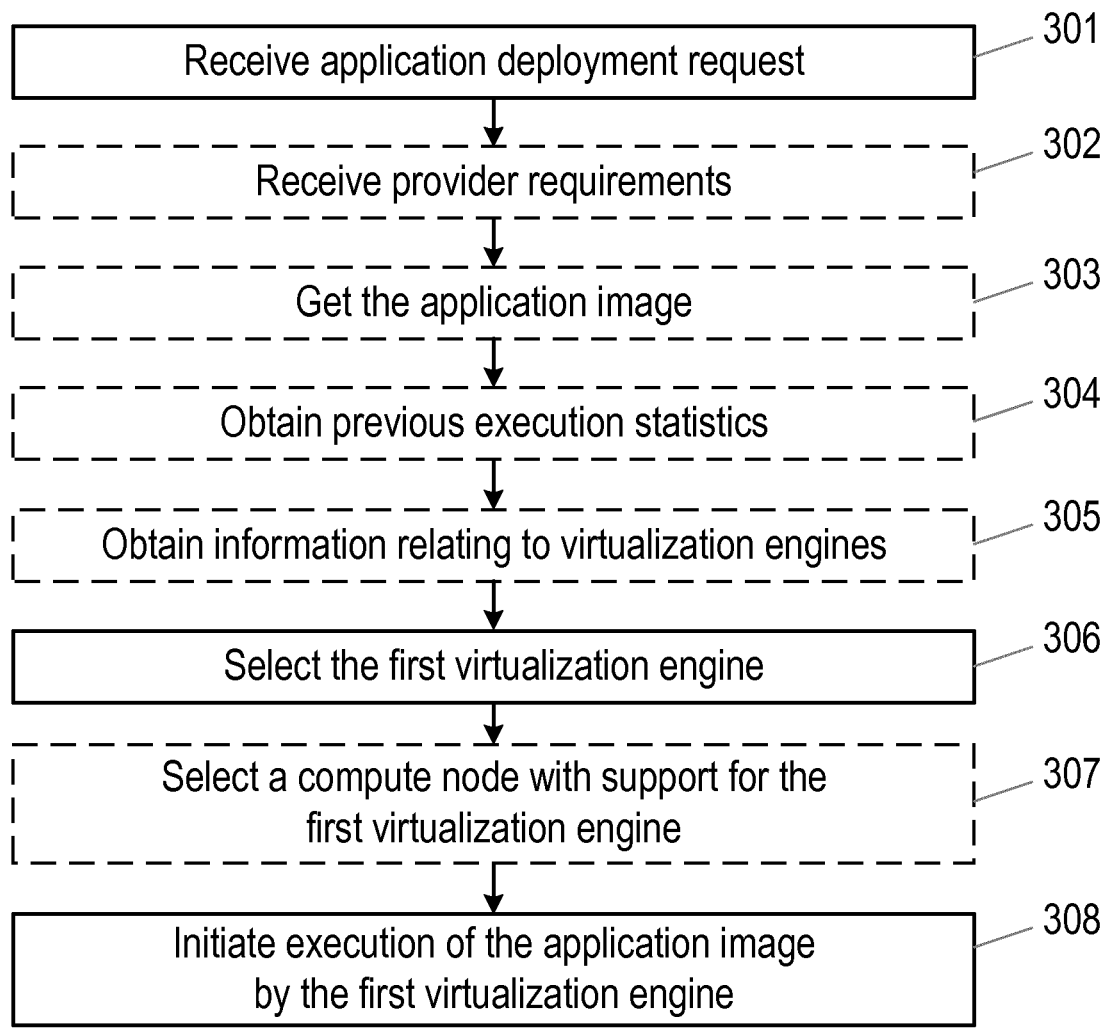
FIG. 3 illustrates a method performed by a selection engine for selecting a first virtualisation engine to execute an application deployment request according to some embodiments.

FIG. 3 illustrates a method performed by a selection engine, for example selection engine 104, for selecting a first virtualisation engine to execute an application deployment request.

In step 301, the selection engine receives the application deployment request comprising an identification of an application image. As noted in FIG. 1, the application deployment request may also comprise one or more user requirements.

User requirements may comprise, for example, one or more of the following:
- A requirement to optimize for start up latency (for some applications the start up latency is the key metric (e.g. Function as a Service systems))
- A requirement to optimize for runtime performance (for some applications the runtime performance (e.g. memory access time, CPU efficiency) is key). To honour this requirement, a virtualization engine with less separation is likely favourable.
- A requirements to optimize security (certain applications (e.g. ones handling sensitive data) may opt for Virtualization engines with the highest security measures, even at the price of lower performance)
- A requirement for direct Virtualization engine selection (users may require specific runtimes for their applications). As the user requirements may only be treated as a hint for the selection engine, the system may not honor this requirement. In this case an appropriate warning may be sent to the user.
- A requirement for direct feature selection (users may require specific runtime features, e.g. using special hardware like GPU or specific volume types). This is a constraint for the virtualization engine selection as the requested feature may not be supported by all virtualization engines.
- A requirement for diversity (users may specify that different instances of the provided application image should be executed on different type of virtualization engines for security and availability reasons).

In step 302, the selection engine may optionally receive one or more provider requirements. For example, a given application image may require different amount of resources (e.g. memory, CPU or power in general) when executed with different virtualization engines. From the provider's perspective it may be beneficial to use the runtime with the lowest resource requirements (making it possible to run more applications on the same hardware). It may be also possible that application A requires less resources with virtualization engine A, while application B operates more cost effectively with virtualization engine B. The selection engine may record such information about previous executions of each application and make decisions accordingly (e.g. by trying virtualisation engines A, B and C for a given application image, then selecting B as the best option).

In step 303, the selection engine may optionally retrieve the application image associated with the identification of the application image. For example, the application image may be retrieved from the application image store as illustrated in FIG. 2. This step may be performed in examples where the selection engine is responsible for passing the application image itself to the execution engine for execution by the selected virtualisation engine. However, it will be appreciated that in some embodiments, different nodes in the system may be responsible for passing the application image to the appropriate engine, and the selection engine may simply select which virtualisation engine is to be used, and may provide the appropriate notification of the selection to other nodes in the system where required.

In step 304, the selection engine may optionally obtain previous execution statistics relating to the execution of the application image by each of a plurality of virtualisation engines that are available to execute the application image. These previous execution statistics may be utilised to determine which of the plurality of virtualisation engines should be selected to execute the application image. The previous execution statistics may be stored by the selection engine 104.

In step 305, the selection engine may optionally obtain information relating to each of the plurality of virtualisation engines. Again this information may be utilised to determine which of the plurality of virtualisation engines should be selected to execute the application image. The information relating to each of the plurality of virtualisation engines may again be stored by the selection engine.

In step 306, the selection engine selects the first virtualisation engine from the plurality of virtualisation engines based on a plurality of respective values of at least one characteristic associated with execution of the application image by each of the plurality of virtualisation engines. For example, the at least one characteristic associated with execution of the application image be each of the plurality of virtualisation engines may comprise one or more of: a security level, a start-up time for the application image; a memory accessing time for the application image; a CPU efficiency; a presence or lack of a feature in the virtualisation engine; and a number of previous executions of the application image by the virtualisation engine.

The respective values of the at least one characteristic may therefore be as follows:
- For a security characteristic, the possible values may be for example "High", "medium" or "low.
- For a start-up time characteristic, the possible values may be for example specific time durations that each virtualisation engine takes to start-up the specific application image.
- For a memory access time characteristic, the possible values may be for example a peak or average amount of memory that each virtualisation engine uses when executing the application image.
- For a CPU efficiency characteristic, the possible values may be specific values of CPU efficiency for each virtualisation engine.
- For a presence of runtime features characteristic, for example the presence of a GPU, the possible values may be "present" or "not present".

For a number of previous executions of the application image by the engine characteristic, the possible values may be integer values representing the different numbers of previous executions of the application image by each of the virtualisation engines.

It will be appreciated that the respective values of the at least one characteristic may have been obtained by the selection engine in steps 304 and 305. For example, the information relating to the start-up time of a particular application image on a particular virtualisation engine may form part of the previous execution statistics obtained in step 304. Similarly, the presence or lack of a GPU in a particular virtualisation engine may form part of the information relating to each of the plurality of virtualisation engines received in step 305.

Furthermore, the respective values of the characteristics may actually fall on a scale between the two extremes. For example, application image from users may be certified, and so have a "medium" security, or images from well-known users can be treated as trusted and so have a "high" security. Application images from users that are not certified may then have a "low" security.

In some embodiments, to perform step 306, the selection engine may prioritise the plurality of respective values of a first characteristic over the plurality of respective values of a second characteristic. For example, the selection engine may be configured to prioritise security over other characteristics when selecting the first virtualisation engine. In this example therefore, when selecting the first virtualisation engine, the selection engine may priorities the value associated with the security characteristic for virtualisation engines over the values associated with other characteristics.

In step 307, the selection engine may select an appropriate compute node for execution of the application image on the first virtualisation engine. This step may be performed where scenarios as in FIG. 2 exist, and not all virtualisation engines are supported by all compute nodes.

In step 308, the selection engine initiates execution of the application image by the first virtualisation engine. In some examples, step 308 comprises the selection engine transmitting the application image to the compute node for execution by the first virtualisation engine. In other embodiments, the selection engine initiates the transfer of the application image by a different network node.

Figure 4:
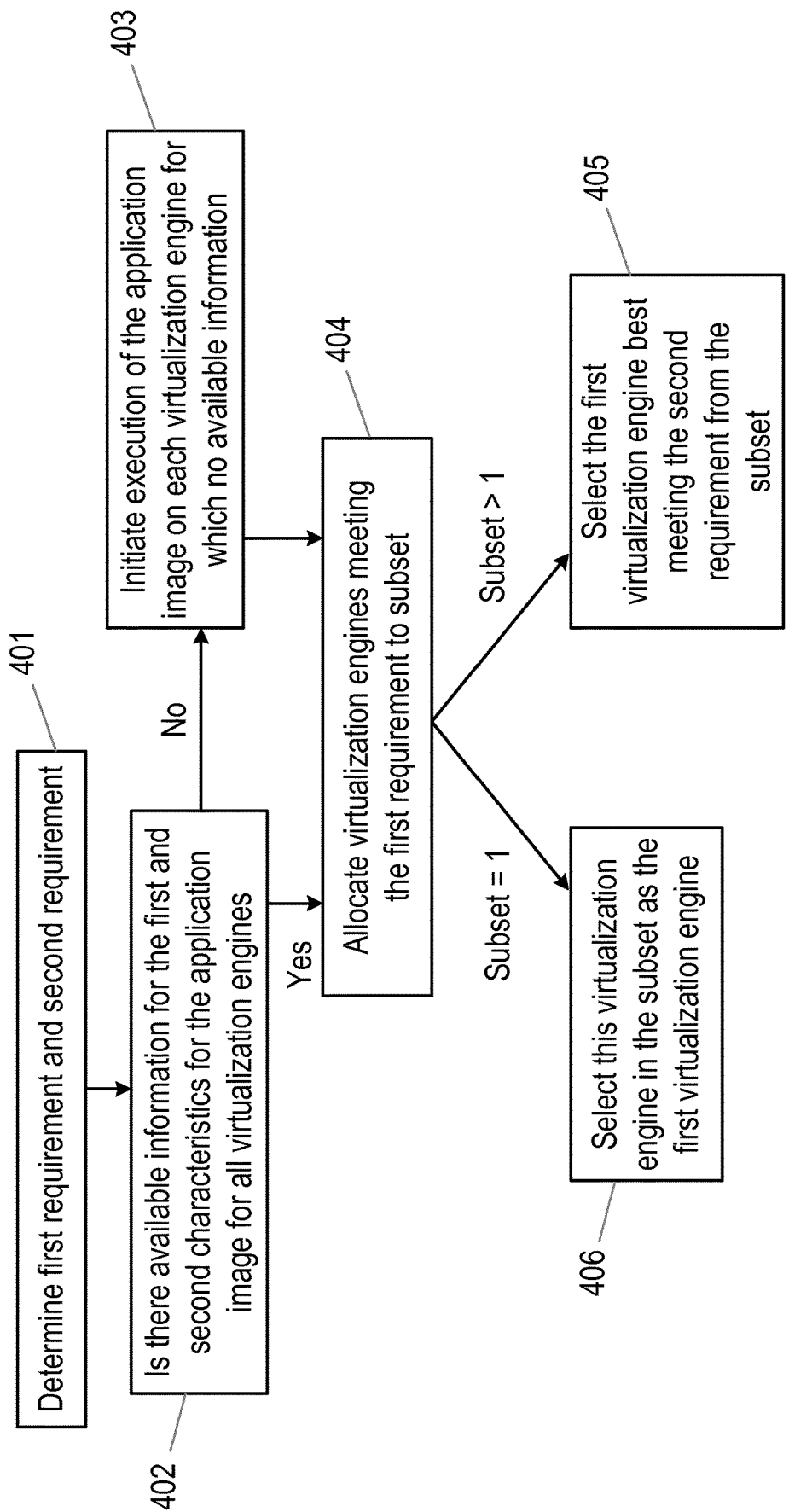
FIG. 4 illustrates an example of step 306 in FIG. 3 in more detail according to some embodiments.

FIG. 4 illustrates an example of step 306 in FIG. 3 in more detail.

In step 401, the selection engine determines a first requirement and a second requirement. The first requirement may then be treated with higher priority than the second requirement. It will be appreciated that there may be any number of requirements which may be prioritised differently. The first requirement and the second requirements may be determined based on the received application identification, any received user requirements in the application deployment request in step 301, and any received provider requirements in step 302.

For example, in a generic cloud environment, users may provide any application image. Such custom application images may contain malicious applications that can target unpublished security issues (e.g. for privilege escalation). To guarantee high level of security, such images can be treated as untrusted, and executed with a virtualization engine that may provide lower performance, but higher isolation guarantees.

On the contrary, cloud providers may offer pre-built applications (e.g. specific data stores) to customers. As these images are created by the provider and most likely only accessible via well-defined APIs, they can be treated as trusted images. These trusted images can be executed with virtualization engines that offer less isolation guarantees but higher performance for example.

The selection engine may therefore be configured to, based on the identification of the application image, determine whether the application image is a user provided application image or a pre-built application image. Responsive to the application image comprising a user provided application image, the selection engine may be configured to set the first requirement as a security requirement. For example, the first requirement may stipulate that the value for the security characteristic associated with the first virtualisation engine must be "high".

In contrast, responsive to the application image comprising a pre-built application image, the selection engine may be configured to look to a different characteristic to determine the first requirements, as security is not considered as high a priority. For example, the selection engine may have received one or both of a user requirement and a provider requirement. The selection engine may be configured to set one of the user requirement or the provider requirement as the first requirement. Whether the selection engine is configured to select the user requirement or provider requirement first may be preconfigured in the selection engine, or may be determined based on the received requirements.

Responsive to the first requirement being a security requirement, the selection engine may be configured to set one of the user requirement or the provider requirement as the second requirement. The selection engine may then be configured to set the other one of the user requirement or the provider requirement as a third requirement. In some examples, the security requirement may be handled with the highest priority, followed by the user requirement and the provider requirement.

It will be appreciated that the order and number of different requirements may be configured differently in different implementations of embodiments described herein. In particular, there may be more than one user requirement that is set as a numbered requirement. In the example illustrated in FIG. 4, two requirements are determined. The first and second requirement may be determined as described above.

In step 402, the selection engine determines if there is available information for a respective value of the first and second characteristics associated with execution of the application image by a third virtualisation engine.

The first characteristic may be based on the first requirement, and the second characteristic may be based on the second requirement. In an example, the first requirement stipulates that the selected virtualisation engine should maximize the number of served requests per second, and so the first characteristic comprises the number of severed requests per second.

Similarly, in an example, the second requirement stipulates that the selected virtualisation engine should minimise the memory usage per application image, so the second characteristic comprises memory usage per application image. In this example, the second requirement may comprise a provider requirement as the goal of the provider may be to minimize the memory usage per application to enable running more application instances on the same amount of hardware.

Responsive to a lack of available information for a respective value of the first characteristic or the second characteristic associated with execution of the application image by any of the virtualisation engines (for example a third virtualisation engine), the method passes to step 403.

In step 403, the selection engine initiates execution of the application image on each virtualisation engine for which there is a lack of available information (for example, the third virtualisation engine) to obtain the respective value of the first and/or second characteristic associated with execution of the application image by the third virtualisation engine. In other words, the selection engine performs test runs of the application image on any virtualisation engines for which information is missing, in order to obtain the missing information for the first or second characteristics. In some examples, the execution engine may report the respective value of the first and/or second characteristic back to the selection engine. In other examples, the application reports the respective value of the first and/or second characteristic back to the selection engine based on internal measurements. Following collection of the missing information, the method passes to step 404.

Responsive to there being available information for both the first and second characteristic for the plurality of virtualisation engines, the method passes to step 404.

In step 404, the selection engine selects a subset of the plurality of virtualisation engines based on the plurality of respective values of the first characteristic. For example, the selection engine may allocate each of the plurality of virtualisation engines whose associated value of the first characteristic for execution of the application image meets the first requirement to the subset of the plurality of virtualisation engines. In the example, where the first requirement stipulates that the first virtualisation engine should maximize the number of served requests per second therefore, the selection engine may put any virtualisation engine whose number of served requests per second when running the application image is a maximum value into the subset.

Responsive to the subset comprising more than one virtualisation engine, the method passes to step 405.

In step 405, the selection engine selects the first virtualisation engine from the subset based on the plurality of respective values of the second characteristic. For example, the selection engine may be configured to select a virtualisation engine from the subset whose associated value of the second characteristic for execution of the application image meets the second requirement as the first virtualisation engine. In other words, in the example where the second requirement stipulates that the selected virtualisation engine should minimise the memory usage per application image, the selection engine may select the first virtualisation engine from the subset as the virtualisation engine that has the minimum memory usage per application image.

Returning to step 404, responsive to the subset comprising only one virtualisation engine, the method passes to step 406, in which the selection engine, selects the one virtualisation engine in the subset as the first virtualisation engine.

It will be appreciated that, in general, the selection engine may be implemented such that the selection of the first virtualization engine is made using a weighted result from the different input sources (i.e. the user requirements, provider requirements etc.). For example, multiple heuristics may be evaluated, each resulting in a preferred (ordered) list of virtualization engines. The previous execution statistics can be used as input for some of the heuristics (e.g. performance measurements). Finally, the user requirements can also result in a preference order of the available virtualization engines that may be weighted in during the final selection.

For example, in some embodiments, the selection engine may be configured to: apply a first weighting value to the plurality of respective values of the first characteristic to generate a plurality of weighted first values; apply a second weighting value to the plurality of respective values of the second characteristic to generate a plurality of weighted second values; determine a plurality of combined values based on the plurality of weighted first values and the plurality of weighted second values, wherein each combined value is associated with execution of the application image by one of the plurality of virtualisation engines; and select the first virtualisation engine based on the plurality of combined values. To perform these embodiments, the qualitative values of some of the proposed characteristics (for example, "high", "medium" and "low" for security) may have to be converted into quantitative equivalents for the purposes of generating the weighted sum.

In some embodiments, after a first virtualisation has been selected to execute an application image, some received input may cause the selection engine to re-select a new virtualisation engine to execute the application.

For example, in some embodiments, responsive to the respective value of the first characteristic for the first virtualisation engine changing such that the respective value no longer meets the first requirement, the selection engine may be configured to remove the first virtualisation engine from the subset of the plurality of virtualisation engines.

The selection engine may then reselect a second virtualisation engine from the subset of the plurality of virtualisation engines; and may initiate execution of the application image by the second virtualisation engine.

Figure 5:
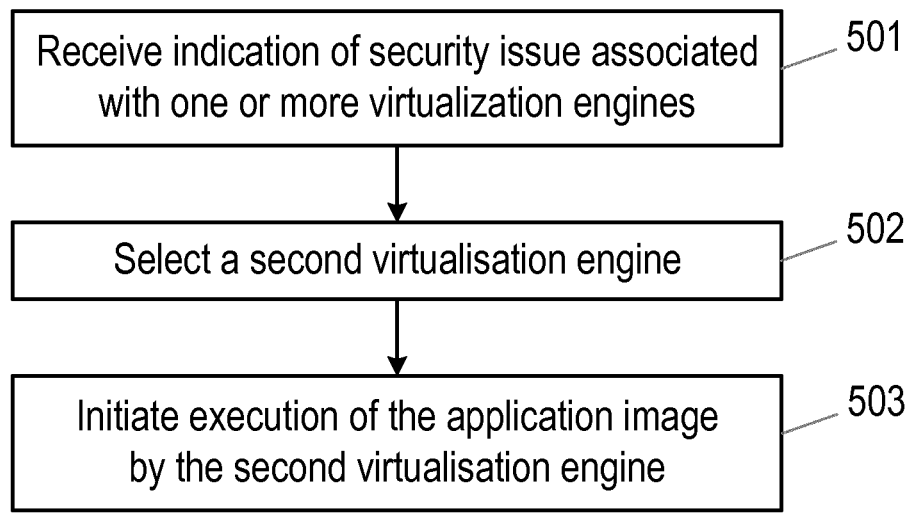
FIG. 5 illustrates an example of a method in the selection engine performed in response to a security issue associated with the first virtualization engine according to some embodiments.

FIG. 5 illustrates an example of a method in the selection engine performed in response to a security issue associated with the first virtualization engine.

System security issues may be published or shared with cloud providers first before publication. Such issues may comprise for example privilege escalation possibilities in the Linux Kernel. A large amount of such issues may impact only a subset of the available virtualization engines in the environment of the cloud provider. In this scenario a restrictive heuristic can be implemented that forces most or all of the applications to be executed on runtimes that are not impacted by the security issue, until it becomes fixed and the Compute Nodes get patched.

In step 501, the selection engine receives an indication of a security issue associated with the first virtualisation engine. For example, security issues discovered about virtualisation engines may be published online. These issues may be automatically retrieved or received by the selection engine.

Responsive to receiving the indication of a security issue associated with the first virtualisation engine, in step 502 the selection engine, selects a second virtualisation engine from the plurality of virtualisation engines based on the plurality of respective values of the at least one characteristic associated with execution of the application image by each of the plurality of virtualisation engines. In other words, as the selection engine has been notified about a security issue with the first virtualisation engine.

For example, as described above, the selection engine may remove the first virtualisation engine from the subset determined as described with reference to FIG. 4, and may select a second virtualisation engine from the remaining virtualisation engines in the subset.

In step 503, the selection engine initiates execution of the application image by the second virtualisation engine. In particular, if multiple applications are affected by the security issue, for example if multiple application images are being run by the affected virtualisation engine, then the selection engine may gradually re-deploy the application images.

Figure 6:
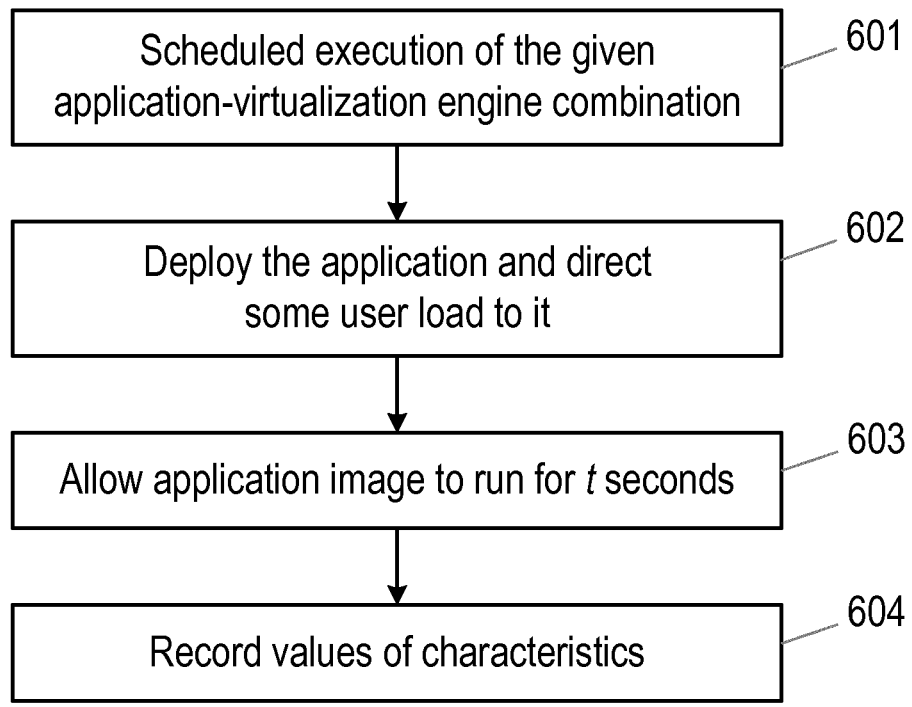
FIG. 6 illustrates a method, in a selection engine, of performing measurements according to some embodiments.

FIG. 6 illustrates a method, in a selection engine, of performing measurements, for example as described in step 403 of FIG. 4.

In step 601, the selection engine schedules execution of the given application image virtualisation engine combination.

In step 602, the selection engine initiates execution of the application image by the virtualisation engine and directs some user load towards the application image.

In step 603, the selection engine allows the application image to run for a duration of t seconds. During this time, the application or the execution image, may report the respective values of the characteristics to the selection engine.

In step 604, the selection engine records the respective values of the characteristics received in step 603 for future deployments and also if a virtualization engine is found to perform better than the previously declared best option, the gradual re-deployment of the application image may be triggered as a final step of this measurement process.

Embodiments described herein may be realized used the OCI runtimes as described above. Essentially, according to the specifications the same container bundle can be executed with different container runtimes. Using the described embodiments, the selection between the runtimes for each bundle deployment can be automated. The different runtimes provide different characteristics:

For example, runC may be the default container runtime that is the most mature, reliable and provides stable performance. RunC uses namespaces resulting in less separation compared to other runtime options. RunC requires a larger amount of memory per container compared to other options, thus having larger cost for the provider.

Crun is an experimental re-implementation of runC providing a ×3 faster startup time. Crun is not mature, thus may contain bugs, but if startup time is a key requirement, it can be a viable selection. Security wise, it is the same as runC.

KataContainers uses lightweight virtual machines. With this significantly different approach, this technology is the most secure OCI compatible runtime. KataContainers starts ×10 slower than runC containers though and provides slightly lower compute performance due to the nature of the used virtualization technique. gVisor provides a different approach for containerization by using a user space kernel for system call interception. While gVisor containers start ×3 faster than runC, they lag behind in some performance benchmarks due to the overhead system call interception. The same system call interception approach though gives a significant security advantage.

Cloud solutions like OpenStack may support multi-hypervisor environments. Embodiments described herein may also be used with virtual machines as well. In an example using hypervisors, different solutions may support different, or only partially overlapping, sets of image formats. As a result, a user supplied application image may need to be converted to a different image format before it can be executed with different hypervisors. In this example, the hypervisors provide different performance characteristics, while security-wise the solutions may be similar. Table 1 illustrates an example performance comparison for 4 well-known hypervisors: XenServer, VMWare vSphere, Hyper-V, Qemu+KVM In particular, table 1 summarizes the determined ranking for the 4 main characteristics.

TABLE 1

Summary of characteristics for hypervisors

|  | vSphere | XenServer | Hyper-V | KVM |
|---|---|---|---|---|
| CPU | 1 | 2 | 4 | 3 |
| Memory | 1 | 2 | 3 | 4 |
| Disk I/O | 1-2 | 3 | 4 | 1-2 |
| Network I/O | 1-2 | 1-2 | 3 | 4 |

Figure 7:
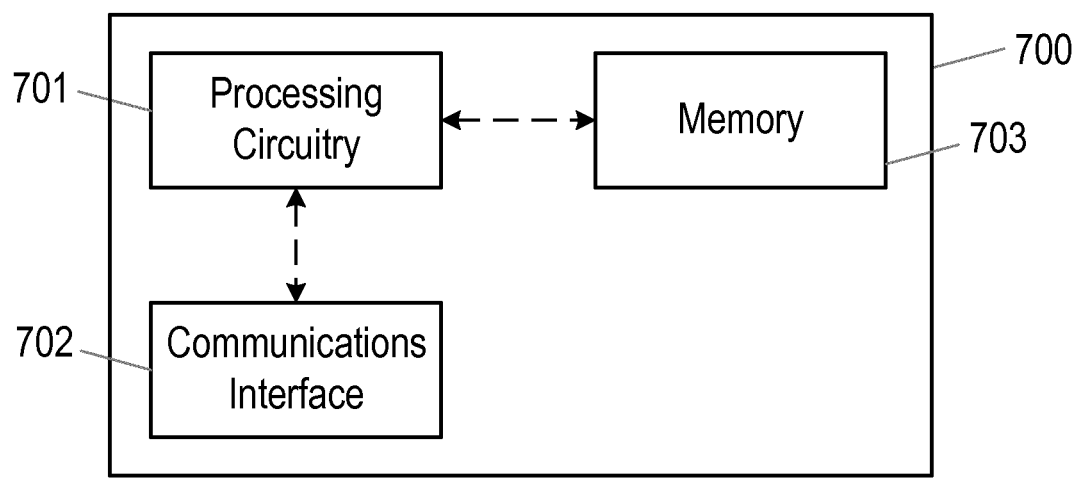
FIG. 7 illustrates a selection engine comprising processing circuitry (or logic).

FIG. 7 illustrates a selection engine 700 comprising processing circuitry (or logic) 701. The processing circuitry 701 controls the operation of the selection engine 700 and may implement the method described herein in relation to a selection engine 700. The processing circuitry 701 may comprise one or more processors, processing units, multi-core processors or modules that are configured or programmed to control the selection engine 700 in the manner described herein. In particular implementations, the processing circuitry 701 may comprise a plurality of software and/or hardware modules that may each be configured to perform, or are for performing, individual or multiple steps of the method described herein in relation to the selection engine 700.

Briefly, the processing circuitry 701 of the selection engine 700 may be configured to: receive the application deployment request comprising an identification of an application image; select the first virtualisation engine from a plurality of virtualisation engines based on a plurality of respective values of at least one characteristic associated with execution of the application image by each of the plurality of virtualisation engines; initiate execution of the application image by the first virtualisation engine In some embodiments, the selection engine 700 may optionally comprise a communications interface 702. The communications interface 702 of the selection engine 700 may be for use in communicating with other nodes, such as other virtual nodes. For example, the communications interface 702 of the selection engine 700 may be configured to transmit to and/or receive from other nodes requests, resources, information, data, signals, or similar. The processing circuitry 701 of selection engine 700 may be configured to control the communications interface 702 of the selection engine 700 to transmit to and/or receive from other nodes requests, resources, information, data, signals, or similar.

Optionally, the selection engine 700 may comprise a memory 703. In some embodiments, the memory 703 of the selection engine 700 may be configured to store program code that can be executed by the processing circuitry 701 of the selection engine 700 to perform the method described herein in relation to the selection engine 700. Alternatively or in addition, the memory 703 of the selection engine 700, can be configured to store any requests, resources, information, data, signals, or similar that are described herein. The processing circuitry 701 of the selection engine 700 may be configured to control the memory 703 of the selection engine 700 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several

The invention claimed is:

1. A method performed by a selection engine for selecting a first virtualisation engine to execute an application deployment request, the method comprising:
receiving the application deployment request comprising an identification of an application image;
selecting the first virtualisation engine from a plurality of virtualisation engines based on a plurality of respective values of at least one characteristic associated with execution of the application image by each of the plurality of virtualisation engines, wherein the at least one characteristic comprises one or more of: a security level, a start-up time for the application image; a memory accessing time for the application image; a CPU efficiency; a presence or lack of a feature in each virtualisation engine; and a number of previous execution statistics of the application image by each virtualisation engine; and
initiating execution of the application image by the first virtualisation engine;
wherein the at least one characteristic comprises a first characteristic and a second characteristic, and wherein selecting the first virtualisation engine comprises prioritising the plurality of respective values of the first characteristic over the plurality of respective values of the second characteristic; and
wherein selecting the first virtualisation engine comprises:
selecting a subset of the plurality of virtualisation engines based on the plurality of respective values of the first characteristic; and
responsive to the subset comprising more than one virtualisation engine, selecting the first virtualisation engine from the subset based on the plurality of respective values of the second characteristic.

2. The method as claimed in claim 1 further comprising; determining the first characteristic based on a first requirement, wherein the first requirement comprises one of: a security requirement, a user requirement indicated in the application deployment request, and a provider requirement.

3. The method as claimed in claim 1 further comprising responsive to the subset comprising only one virtualisation engine, selecting the one virtualisation engine as the first virtualisation engine.

4. The method as claimed in claim 1, wherein selecting a subset of the plurality of virtualisation engines comprises:
allocating each of the plurality of virtualisation engines whose associated value of the first characteristic for execution of the application image meets the first requirement to the subset of the plurality of virtualisation engines.

5. The method as claimed in claim 1 wherein the selecting the first virtualisation engine from the subset based on the plurality of respective values of the second characteristic comprises:
selecting a virtualisation engine from the subset whose associated value of the second characteristic for execution of the application image meets a second requirement as the first virtualisation engine.

6. The method as claimed in claim 5 wherein the second requirement comprises one of: a security requirement, a user requirement indicated in the application deployment request, and a provider requirement.

7. The method as claimed in claim 1 wherein selecting the first virtualisation engine comprises:
applying a first weighting value to the plurality of respective values of the first characteristic to generate a plurality of weighted first values;
applying a second weighting value to the plurality of respective values of the second characteristic to generate a plurality of weighted second values;
determining a plurality of combined values based on the plurality of weighted first values and the plurality of weighted second values, wherein each combined value is associated with execution of the application image by one of the plurality of virtualisation engines; and
selecting the first virtualisation engine based on the plurality of combined values.

8. The method as claimed in claim 1 further comprising:
responsive to a lack of available information for a respective value of the at least one characteristic associated with execution of the application image by a third virtualisation engine in the plurality of virtualisation engines;
before performing the step of selecting the first virtualisation engine, initiating execution of the application image by the third virtualisation engine to obtain the respective value of the at least one characteristic associated with execution of the application image by the third virtualisation engine.

9. A method performed by a selection engine for selecting a first virtualisation engine to execute an application deployment request, the method comprising:
receiving the application deployment request comprising an identification of an application image;
selecting the first virtualisation engine from a plurality of virtualisation engines based on a plurality of respective values of at least one characteristic associated with execution of the application image by each of the plurality of virtualisation engines, wherein the at least one characteristic comprises one or more of: a security level, a start-up time for the application image; a memory accessing time for the application image; a CPU efficiency; a presence or lack of a feature in each virtualisation engine; and a number of previous execution statistics of the application image by each virtualisation engine; and
initiating execution of the application image by the first virtualisation engine; and
wherein the method further comprises:
responsive to receiving an indication of a security issue associated with the first virtualisation engine;
selecting a second virtualisation engine from the plurality of virtualisation engines based on the plurality of respective values of the at least one characteristic associated with execution of the application image by each of the plurality of virtualisation engines; and
initiating execution of the application image by the second virtualisation engine.

10. A selection engine for selecting a first virtualisation engine to execute an application deployment request, the selection engine comprising processing circuitry configured to:
receive the application deployment request comprising an identification of an application image;
select the first virtualisation engine from a plurality of virtualisation engines based on a plurality of respective values of at least one characteristic associated with execution of the application image by each of the plurality of virtualisation engines, wherein the at least one characteristic comprises one or more of: a security level, a start-up time for the application image; a memory accessing time for the application image; a CPU efficiency; a presence or lack of a feature in each virtualisation engine; and a number of previous execution statistics of the application image by each virtualisation engine; and initiate execution of the application image by the first virtualisation engine;

wherein the at least one characteristic comprises a first characteristic and a second characteristic, and wherein selecting the first virtualisation engine comprises prioritising the plurality of respective values of the first characteristic over the plurality of respective values of the second characteristic; and wherein the processing circuitry is configured to select the first virtualisation engine by:

selecting a subset of the plurality of virtualisation engines based on the plurality of respective values of the first characteristic; and responsive to the subset comprising more than one virtualisation engine, selecting the first virtualisation engine from the subset based on the plurality of respective values of the second characteristic.

11. The selection engine as claimed in claim 10 wherein processing circuitry is configured to select the first virtualisation engine from the subset based on the plurality of respective values of the second characteristic by:

selecting a virtualisation engine from the subset whose associated value of the second characteristic for execution of the application image meets a second requirement as the first virtualisation engine.

12. The selection engine as claimed in claim 10 wherein the processing circuitry is configured to select the first virtualisation engine by:

applying a first weighting value to the plurality of respective values of the first characteristic to generate a plurality of weighted first values;

applying a second weighting value to the plurality of respective values of the second characteristic to generate a plurality of weighted second values;

determining a plurality of combined values based on the plurality of weighted first values and the plurality of weighted second values, wherein each combined value is associated with execution of the application image by one of the plurality of virtualisation engines; and selecting the first virtualisation engine based on the plurality of combined values.

13. A selection engine for selecting a first virtualisation engine to execute an application deployment request, the selection engine comprising processing circuitry configured to:

receive the application deployment request comprising an identification of an application image;

select the first virtualisation engine from a plurality of virtualisation engines based on a plurality of respective values of at least one characteristic associated with execution of the application image by each of the plurality of virtualisation engines, wherein the at least one characteristic comprises one or more of: a security level, a start-up time for the application image; a memory accessing time for the application image; a CPU efficiency; a presence or lack of a feature in each virtualisation engine; and a number of previous execution statistics of the application image by each virtualisation engine; and initiate execution of the application image by the first virtualisation engine;

wherein the processing circuitry is further configured to:

responsive to receiving an indication of a security issue associated with the first virtualisation engine, select a second virtualisation engine from the plurality of virtualisation engines based on the plurality of respective values of the at least one characteristic associated with execution of the application image by each of the plurality of virtualisation engines; and initiate execution of the application image by the second virtualisation engine.

* * * * *